(12) United States Patent
Yabuki et al.

(10) Patent No.: US 8,527,553 B2
(45) Date of Patent: *Sep. 3, 2013

(54) DATA MANAGEMENT APPARATUS AND DATA DISTRIBUTION SYSTEM

(75) Inventors: Kosuke Yabuki, Kyoto (JP); Katsuhito Nishimura, Kyoto (JP); Tokihiko Toyoda, Kyoto (JP); Tetsuya Nakata, Kyoto (JP); Yusuke Shiraiwa, Kyoto (JP); Shigetoshi Kitayama, Kyoto (JP); Jun Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 41 days.

This patent is subject to a terminal disclaimer.

(21) Appl. No.: 13/316,647

(22) Filed: Dec. 12, 2011

(65) Prior Publication Data

US 2012/0116551 A1     May 10, 2012

Related U.S. Application Data

(63) Continuation of application No. 12/000,262, filed on Dec. 11, 2007, now Pat. No. 8,103,700.

(30) Foreign Application Priority Data

Oct. 3, 2007   (JP) .................................. 2007-260311

(51) Int. Cl.
*G06F 17/30* (2006.01)

(52) U.S. Cl.
USPC ........................................................ 707/803

(58) Field of Classification Search
USPC .......................... 707/791, 793, 802, 803, 812
See application file for complete search history.

(56) References Cited

U.S. PATENT DOCUMENTS 5,678,001 A * 10/1997 Nagel et al. ................... 345/473
(Continued)

FOREIGN PATENT DOCUMENTS

| EP | 1 371 403 | 12/2003 |
|---|---|---|
| EP | 1 475 134 | 11/2004 |

(Continued)

OTHER PUBLICATIONS

Han et al., "Data Mining: Concepts and Techniques" Academic Press, 2001, 13 pages.

*Primary Examiner* — Cam-Linh Nguyen
(74) *Attorney, Agent, or Firm* — Nixon & Vanderhye P.C.

(57) ABSTRACT

Ghost data used for reproducing a game process executed by user operations are transmitted from game apparatuses to a data management apparatus. The data management apparatus stores the received ghost data, according to a definition of a database in which score sections are defined based on a value represented by score data, and a maximum registration allowable number of users for which the ghost data are registered is defined for each of the score sections, or is defined so as to be the same among the score sections. The data management apparatus transmits, when a ghost data distribution request is received, the ghost data for at least one user for which the ghost data is registered so as to be associated with one of the score sections, the scores section being associated with the score data included in the ghost data distribution request, to the one of the game apparatuses.

18 Claims, 15 Drawing Sheets

(56) References Cited

U.S. PATENT DOCUMENTS

| | | |
|---|---|---|
| 6,398,641 B1 | 6/2002 | Yamagami et al. |
| 6,475,089 B1 | 11/2002 | Lee |
| 6,554,706 B2 * | 4/2003 | Kim et al. .................. 463/36 |
| 6,996,444 B2 | 2/2006 | Ach, III |
| 7,632,186 B2 * | 12/2009 | Spanton et al. .................. 463/40 |
| 2007/0232400 A1 * | 10/2007 | Takahashi et al. .............. 463/42 |
| 2008/0125229 A1 | 5/2008 | Jonishi |
| 2009/0069091 A1 | 3/2009 | Yamamoto |

FOREIGN PATENT DOCUMENTS

| | | |
|---|---|---|
| EP | 1 518 594 | 3/2005 |
| EP | 1 570 887 | 9/2005 |
| EP | 1 595 585 | 11/2005 |
| EP | 1 810 732 | 7/2007 |
| EP | 1 825 896 | 8/2007 |
| GB | 2 044 053 | 10/1980 |
| JP | 2003-320164 | 11/2003 |
| WO | WO2007/061067 | 5/2007 |

* cited by examiner

F I G. 4
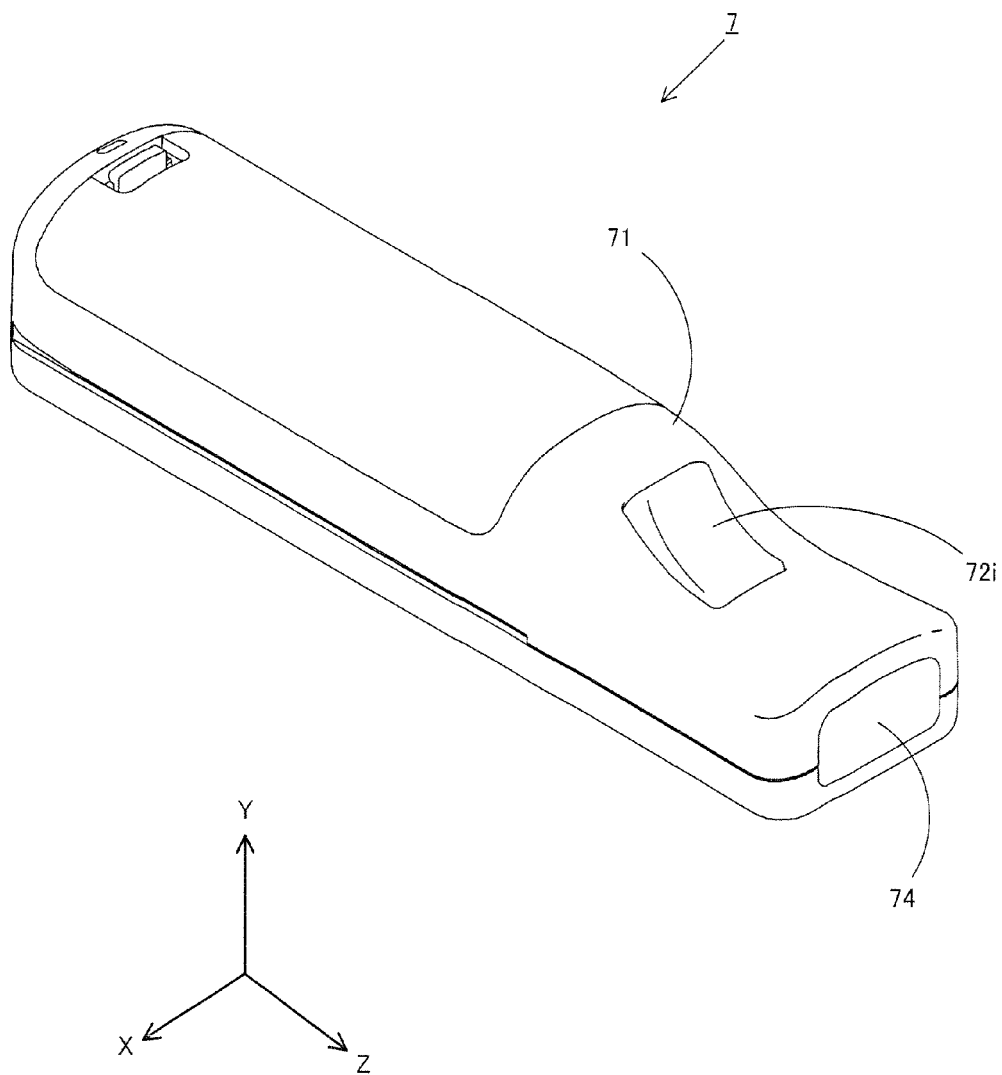

F I G. 8
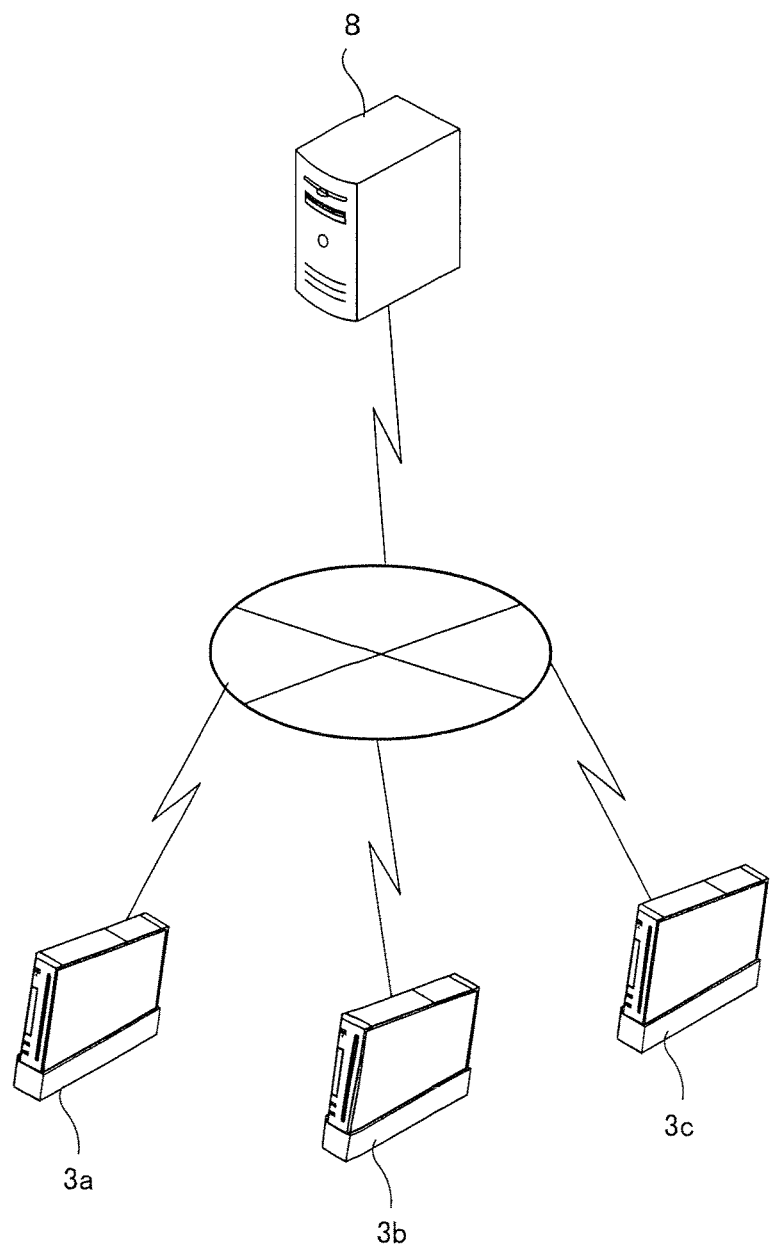

Op — PLAYER OBJECT
Og — GHOST OBJECT

FIG. 12

| GHOST DATA ||
|---|---|
| NAME OF USER | ICHIRO |
| USER ICON ID | 13121488 |
| RESIDENCE AREA | JAPAN |
| COURSE NUMBER | 02 |
| CHARACTER NUMBER | 01 |
| MACHINE TYPE | STANDARD TYPE |
| PLAY DATA | ...... |
| ACCOMPLISHMENT TIME | 5:45:288 (MINUTES:SECONDS: MICROSECONDS) |
| PLAY DATE AND TIME | JULY 31, 2007 6:05 PM |

FIG. 13

| PLAY DATA ||
|---|---|
| ELAPSED TIME (MINUTES:SECONDS: MICROSECONDS) | INPUT KEY TYPE |
| 0:0:000 | A & ↑ |
| 0:0:354 | A |
| 0:1:002 | A & ← |
| ⋮ | ⋮ |
| 5:45:288 | A |

FIG. 14

| COURSE NUMBER | TIME SECTION NUMBER | GHOST DATA |
|---|---|---|
| 01 | 00 | (20) GHOST DATA STORAGE AREA |
| | 01 | (20) GHOST DATA STORAGE AREA |
| | 02 | (20) GHOST DATA STORAGE AREA |
| | ⋮ | ⋮ |
| | 99 | (20) GHOST DATA STORAGE AREA |
| 02 | 00 | (20) GHOST DATA STORAGE AREA |
| | 01 | (20) GHOST DATA STORAGE AREA |
| | 02 | (20) GHOST DATA STORAGE AREA |
| | ⋮ | ⋮ |
| | 99 | (20) GHOST DATA STORAGE AREA |
| ⋮ | ⋮ | ⋮ |
| 32 | 00 | (20) GHOST DATA STORAGE AREA |
| | 01 | (20) GHOST DATA STORAGE AREA |
| | 02 | (20) GHOST DATA STORAGE AREA |
| | ⋮ | ⋮ |
| | 99 | (20) GHOST DATA STORAGE AREA |

GHOST TABLE

FIG. 15

| COURSE NUMBER | TIME SECTION SETTING DATA | | |
|---|---|---|---|
| | TIME SECTION NUMBER | MINIMUM TIME (MINUTES:SECONDS: MICROSECONDS) | MAXIMUM TIME (MINUTES:SECONDS: MICROSECONDS) |
| 01 | 00 | 2:0:001 | 2:1:000 |
| | 01 | 2:1:001 | 2:2:000 |
| | 02 | 2:2:001 | 2:3:000 |
| | ⋮ | ⋮ | ⋮ |
| | 99 | 3:39:001 | 3:40:000 |
| 02 | 00 | 5:30:001 | 5:32:000 |
| | 01 | 5:32:001 | 5:34:000 |
| | 02 | 5:34:001 | 5:36:000 |
| | ⋮ | ⋮ | ⋮ |
| | 99 | 8:48:001 | 8:50:000 |
| ⋮ | ⋮ | ⋮ | ⋮ |
| 32 | 00 | 4:0:001 | 4:1:000 |
| | 01 | 4:1:001 | 4:2:000 |
| | 02 | 4:2:001 | 4:3:000 |
| | ⋮ | ⋮ | ⋮ |
| | 99 | 8:40:001 | 8:45:000 |

DATA MANAGEMENT APPARATUS AND DATA DISTRIBUTION SYSTEM

CROSS REFERENCE TO RELATED APPLICATION

This application is a continuation of Ser. No. 12/000,262 filed Dec. 11, 2007, which claims priority under 35 U.S.C. §119(a) to Patent Application No. 2007-260311 filed in Japan on Oct. 3, 2007, the entire contents of which are hereby incorporated by reference.

BACKGROUND

1. Field

Example embodiments of the present invention relate to a data management apparatus and a data distribution system, and more particularly to a data management apparatus and a data distribution system for displaying ghost data based on a history of a game having been previously played.

2. Description of the Background Art

In a racing game system disclosed in Japanese Laid-Open Patent Publication No. 2003-320164, three-dimensional image data (ghost data) generated in a game which is played using an individual racing game apparatus is uploaded to a database server through a communication line so as to be stored in a high-capacity storage device of the database server. When a player of a racing game apparatus desires that a racing car of the player compete with a racing car (ghost car) which was previously operated by another player, the racing game apparatus accesses the database server through the communication line so as to download ghost data of the game selected from among ghost data which are obtained when other players previously played the game, and which are stored in the high-capacity storage device of the database server. At this time, based on a ranking list created by a management device of the database server, the ghost data ranked immediately above or a few ranks higher than data of the best record of the player operating the racing game apparatus is automatically selected. Thus, the player is allowed to cause his/her car to compete with a ghost car of another player who matches the player in skill.

However, the racing game system disclosed in Japanese Laid-Open Patent Publication No. 2003-320164 has a problem that a high-capacity storage device is necessary for storing all the ghost data uploaded to the database server from the individual racing game apparatuses. Further, the storage capacity of the high-capacity storage device is limited, and therefore the amount of the ghost data to be uploaded to the database server is also limited. Furthermore, the ranking list is created based on all the ghost data uploaded from the individual racing game apparatuses to the database server, and therefore there is a problem that processing load necessary for creating the ranking list is large.

In order to solve the problem, only the ghost data (for example, the ghost data for top 1000 players) ranked higher than a predetermined rank in the ranking list may be stored in the high-capacity storage device instead of storing, in the high-capacity storage device, all the ghost data uploaded from the individual racing game apparatuses to the database server. In this case, however, an unskilled player is not allowed to compete, in operating a car, with another player who matches the unskilled player in skill since the ghost data of the another player may not be stored in the high-capacity storage device of the database server.

SUMMARY

Therefore, example embodiments of the present invention provide a system capable of limiting the capacity for storing data in a server to a predetermined range of capacity, and allowing each player to obtain ghost data in accordance with a skill of the player.

Example embodiments of the present invention may have the following features. The reference numerals, figure numbers, supplementary descriptions, and the like in the parentheses in the following description indicate an exemplary correspondence with the drawings, and are not intended to limit, in any way, the scope of the present invention.

According to example embodiments of the present invention, a data management apparatus (8) collects data generated by a plurality of information terminals (3), and transmits, in accordance with a request from a one of the plurality of information terminals, necessary data to the one of the plurality of information terminals, and comprises reception means (81, 84, S30) and database process means (81, 83, S34). The reception means receives, from a one of the plurality of information terminals, both ghost data (FIG. 12) used for reproducing a game process having been executed in accordance with an operation performed by a user of the one of the plurality of information terminals, and score data (accomplishment time) which represents an index indicating a skill of a game based on the ghost data. The database process means stores the received ghost data in accordance with a definition (FIG. 14) of a database in which a plurality of score sections are defined based on a value represented by the score data, and a maximum registration allowable number of users for which the ghost data are registered is defined for each of the plurality of score sections, or is defined so as to be the same among the plurality of score sections.

The database process means may include: database storage means (83); score section determination means (81, S31); registration means (81, S34); and deletion means (81, S33). The database storage means stores the database in which the plurality of score sections are defined based on the value represented by the score data. The score section determination means determines one of the plurality of score sections, with which the received ghost data is to be associated, in accordance with the score data received with the ghost data, when the ghost data is received by the reception means from a one of the plurality of information terminals. The registration means registers the ghost data in the database so as to be associated with the one of the plurality of score sections determined by the score section determination means. The deletion means deletes, as necessary, the ghost data for at least one user for which the ghost data has been already registered, such that, in the one of the plurality of score sections, the number of users for which the ghost data are registered is not greater than the maximum registration allowable number of users for which the ghost data are registered, when the ghost data is registered by the registration means. The deletion means may delete, as necessary, the registered ghost data after new ghost data is registered by the registration means. Alternatively, the deletion means may delete, as necessary, the registered ghost data before new ghost data is registered by the registration means. In the former case, the number of users for which the ghost data are registered is greater than the maximum registration allowable number only for a short period of time. In the latter case, the number of users for which the ghost data are registered is never greater than the maximum registration allowable number.

Further, the data management apparatus may further comprise transmission means (81, 84, S39) for transmitting, to a one of the plurality of information terminals, the ghost data for at least one user for which the ghost data is registered so as to be associated with one of the plurality of score sections in the database, in accordance with a ghost data distribution request for requesting the ghost data, when the ghost data distribution request is received from the one of the plurality of information terminals.

Further, the ghost data distribution request from a one of the plurality of information terminals includes the score data of the game played by using the one of the plurality of information terminals, and the transmission means may transmit, to the one of the plurality of information terminals, the ghost data for at least one user for which the ghost data is registered so as to be associated with one of the plurality of scores sections, the one of the plurality of score sections being associated with the score data included in the ghost data distribution request.

Further, the ghost data distribution request from a one of the plurality of information terminals includes the score data of the game played by using the one of the plurality of information terminals, and the transmission means may transmit, to the one of the plurality of information terminals, the ghost data for at least one user for which the ghost data is registered so as to be associated with one of the plurality of score sections in the vicinity of another one of the plurality of score sections, the another one of the plurality of score sections being associated with the score data included in the ghost data distribution request.

Further, the ghost data includes information of an area in which the ghost data is generated, and the ghost data distribution request from the one of the plurality of information terminals includes information of an area in which the one of the plurality of information terminals is provided, and the transmission means may transmit, to the one of the plurality of information terminals, the ghost data having been received with the score data which is best of all the score data of the ghost data including the information of the area which is the same as the information of the area included in the ghost data distribution request.

Further, the ghost data may include key operation history data (FIG. 13) in which keys, of a corresponding one of the plurality of information terminals, operated by a user are stored in chronological order.

Further, the ghost data may include action data representing an action of a subject to be operated (Op) in a game space, when a user operates keys of a corresponding one of the plurality of information terminals.

Further, the game process is a process performed in a racing game which allows a user to operate a game character, and the ghost data is used for reproducing a movement of the game character (Op) operated by a user playing the game in which the user competes in a time in which the racing game is cleared, or a time in which a course is finished, and the score data is time information representing the time in which the racing game is cleared, or the time in which a course is finished.

Further, the deletion means may delete the ghost data having been registered in the database earliest of all the ghost data of one of the plurality of score sections, the one of the plurality of score sections being associated with the ghost data having been newly received.

Further, the deletion means may delete the ghost data having been generated, by one of the plurality of information terminals, earliest of all the ghost data of one of the plurality of score sections, the one of the plurality of score sections being associated with the ghost data having been newly received.

According to example embodiments of the present invention, a data distribution system allows a data management apparatus (8) to collect data generated by a plurality of information terminals (3), and transmit necessary data to a one of the plurality of information terminals, in accordance with a request from the one of the plurality of information terminals. Each of the plurality of information terminals includes data generation means (10, S11), data transmission means (10, S14), and request transmission means (10, 18, S17). The data generation means generates both ghost data (FIG. 12) used for reproducing a game process having been executed in accordance with an operation performed by a user of said each of the plurality of information terminals, and score data which represents an index indicating a skill of a game based on the ghost data. The data transmission means transmits, to the data management apparatus, the ghost data generated by the data generation means and the score data based on the ghost data. The request transmission means transmits, to the data management apparatus, a ghost data distribution request for requesting the ghost data. The data management apparatus includes data reception means (81, 84, S30), database process means (81, 83, S34), and data transmission means (81, 84, S39). The data reception means receives, from the plurality of information terminals, the ghost data, and the score data (accomplishment time) based on the ghost data. The database process means stores the received ghost data in accordance with a definition (FIG. 14) of a database in which a plurality of score sections are defined based on a value represented by the score data, and a maximum registration allowable number of users for which the ghost data are registered is defined for each of the plurality of score sections, or is defined so as to be the same among the plurality of score sections. The data transmission means transmits, to a one of the plurality of information terminals, the ghost data for at least one user for which the ghost data is registered so as to be associated with one of the plurality of score sections in the database, in accordance with the ghost data distribution request, among the ghost data stored by the database process means, when the ghost data distribution request is received from the one of the plurality of information terminals.

According to example embodiments of the present invention, the total capacity for storing the ghost data in a server is limited to a predetermined range of capacity, and each player is allowed to obtain the ghost data in accordance with a skill of said each player.

These and other features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 4 is a perspective view of the controller 7 as viewed from the bottom front side thereof;

FIG. 8 is a diagram illustrating a configuration of a data distribution system according to the embodiment;

FIG. 12 is a diagram illustrating exemplary ghost data;

FIG. 13 is a diagram illustrating exemplary play data;

FIG. 14 is a diagram illustrating an exemplary ghost table;

FIG. 15 is a diagram illustrating exemplary time section setting data;

DESCRIPTION OF THE PREFERRED EMBODIMENTS (Entire Structure of Game System)

Figure 1:
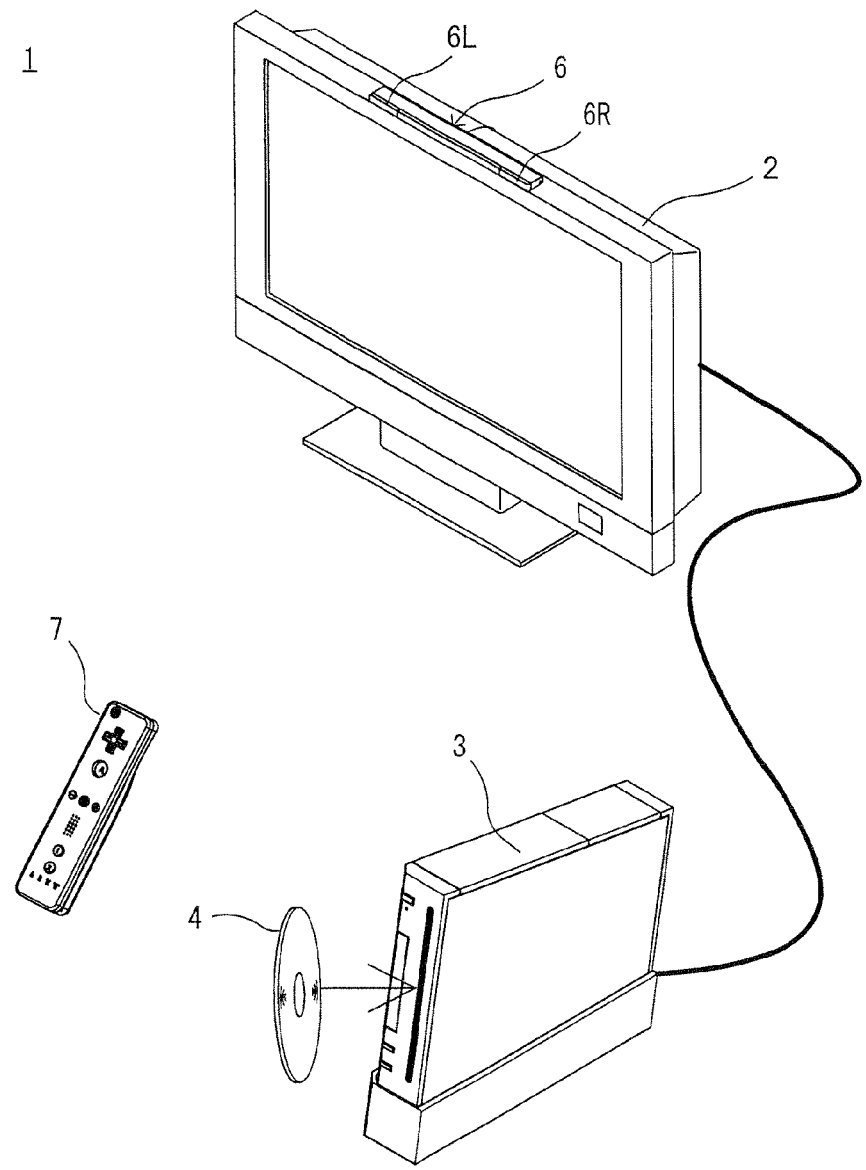
FIG. 1 is an external view illustrating a game system 1 according to an embodiment of the present invention.

With reference to FIG. 1, a game system 1 including a game apparatus according to an embodiment of the present invention will be described. FIG. 1 is an external view illustrating the game system 1. Hereinafter, a game apparatus and a game program according to the present embodiment will be described by using a stationary game apparatus as an example. As shown in FIG. 1, the game system 1 includes a television receiver (hereinafter, referred to simply as a television set) 2, a game apparatus 3, an optical disc 4, a marker section 6, and a controller 7. The system according to the present embodiment allows the game apparatus 3 to execute game process based on a game played using the controller 7.

Into the game apparatus 3, the optical disc 4, which typifies an information storage medium and is exchangeable with respect to the game apparatus 3, is detachably inserted. In the optical disc 4, the game program executed by the game apparatus 3 is stored. The game apparatus 3 has, on the front surface thereof, an opening through which the optical disc 4 is inserted. The game apparatus 3 executes the game process by reading and executing the game program stored in the optical disc 4 which is inserted in the game apparatus 3 through the opening.

The game apparatus 3 is connected through a connection cord to the television set 2 typifying a display device. The television set 2 displays a game image generated through the game process executed by the game apparatus 3. Further, the marker section 6 is provided in the vicinity of the screen of the television set 2 (on the top surface of a screen of the television set 2 in FIG. 1). The marker section 6 includes two markers, a marker 6R and a marker 6L, at both ends thereof. Specifically, each of the markers 6R and 6L includes at least one infrared LED, and emits an infrared light forward from the television set 2. The marker section 6 is connected to the game apparatus 3, and the game apparatus 3 is capable of controlling each infrared LED included in the marker section 6 so as to be lit up.

The controller 7 is an input device for supplying, to the game apparatus 3, operation data representing a content of an operation performed on the controller 7. The controller 7 is connected to the game apparatus 3 by wireless communication. In the present embodiment, for example, the Bluetooth (registered trademark) technology is used for the wireless communication between the controller 7 and the game apparatus 3. In another embodiment, the controller 7 and the game apparatus 3 may communicate with each other by a wired connection.

(Internal Structure of Game Apparatus 3)

Figure 2:
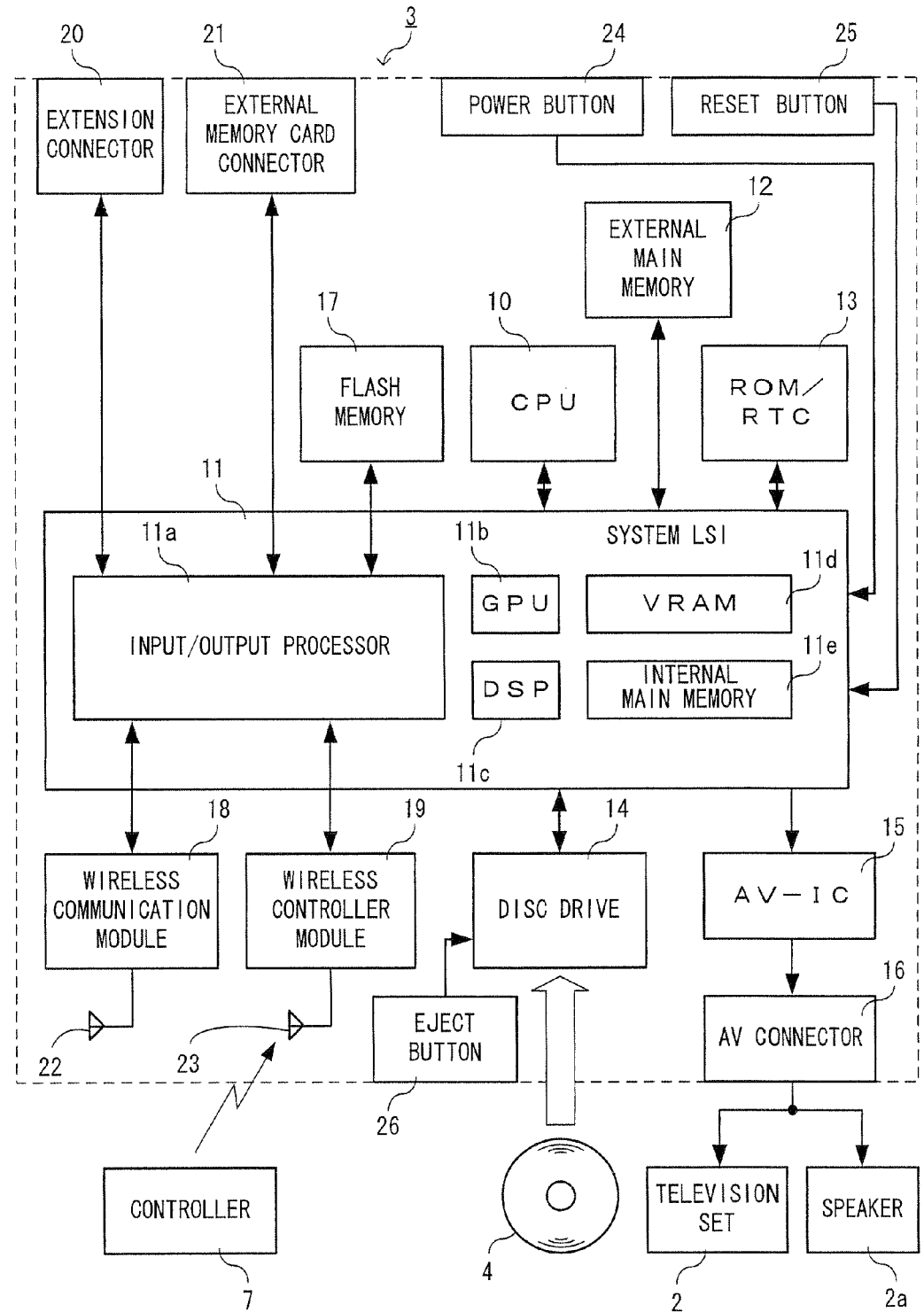
FIG. 2 is a functional block diagram of a game apparatus 3.

Next, with reference to FIG. 2, an internal structure of the game apparatus 3 will be described. FIG. 2 is a block diagram illustrating a structure of the game apparatus 3. The game apparatus 3 includes: the CPU 10; a system LSI 11; an external main memory 12; a ROM/RTC 13; a disc drive 14; an AV-IC 15, and the like.

The CPU 10, serving as a game processor, executes the game program stored in the optical disc 4 so as to perform the game process. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal structure of the system LSI will be described below. The external main memory 12, which is of a volatile type, stores programs, such as a game program loaded from the optical disc 4 or a flash memory 17, and various data, and is used as a work area and a buffer area for the CPU 10. The ROM/RTC 13 includes a ROM (so-called a boot ROM) incorporating a program for booting the game apparatus 3, and a clock circuit (RTC: real time clock) for counting time. The disc drive 14 reads, from the optical disc 4, program data, texture data and the like, and writes the read data into an internal main memory 11e described below or the external main memory 12.

Provided in the system LSI 11 are an input/output processor (I/O processor) 11a, a GPU (graphics processor unit) 11b, a DSP (digital signal processor) 11c, a VRAM 11d, and the internal main memory 11e. These component 11a, 11b, 11c, 11d and 11e are connected to each other via an internal bus not shown.

The GPU 11b, which is a part of rendering means, generates an image in accordance with a graphics command (draw command) from the CPU 10. The VRAM 11d stores data (such as polygon data and texture data) necessary for the GPU 11b to execute the graphics command. When an image is generated, the GPU 11b generates image data by using the data stored in the VRAM 11d.

The DSP 11c functions as an audio processor, and generates audio data by using sound data and sound waveform (tone quality) data stored in the internal main memory 11e and the external main memory 12.

The image data and the audio data generated as described above, are read by the AV-IC 15. The AV-IC 15 outputs the read image data to the television set 2 via an AV connector 16, and also outputs the read audio data to a speaker 2a of the television set 2. Thus, an image is displayed on the television set 2, and a sound is outputted from the speaker 2a.

The I/O processor 11a executes data reception and transmission among the components connected thereto and download of data from an external apparatus. The I/O processor 11a is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11a is connected to a network via the wireless communication module 18 and the antenna 22 so as to communicate with other game apparatuses or various servers connected to the network. The I/O processor 11a accesses the flash memory 17 at regular time intervals so as to detect for data to be transmitted to the network. When the data to be transmitted is detected, the data is transmitted to the network via the wireless communication module 18 and the antenna 22. Further, the I/O processor 11a receives, via the network, the antenna 22 and the wireless communication module 18, data transmitted from the other game apparatuses or data downloaded from a download server, and stores the received data in the flash memory 17. The CPU 10 executes the game program so as to read the data stored in the flash memory 17, thereby using the read data on the game program. The flash memory 17 may store not only the data transmitted and received among the game apparatus 3, and other game apparatuses or the various servers, but also saved data (result data or intermediate step data of the game) of a game played with the game apparatus 3.

Further, the I/O processor 11a receives the operation data transmitted from the controller 7 via the antenna 23 and the wireless controller module 19, and (temporarily) stores the operation data in a buffer area of the internal main memory 11e or the external main memory 12.

Further, the I/O processor 11a is connected to the extension connector 20 and the external memory card connector 21. The extension connector 20, which is a connector used for interface such as a USB and an SCSI, allows communication with the network, without using the wireless communication module 18, by connecting, to the extension connector 20, a media such as an external storage medium, or a peripheral device such as another controller, or a wired communication connector. The external memory card connector 21 is a connector for connecting to the external memory card connector 21 the external storage medium such as a memory card. For example, the I/O processor 11a accesses the external storage medium via the extension connector 20 or the external memory card connector 21, so as to store data in the external storage medium or read data from the external storage medium.

The game apparatus 3 includes a power button 24, a reset button 25, and an eject button 26. The power button 24 and the reset button 25 are connected to the system LSI 11. When the power button 24 is pressed so as to be ON, the power is supplied to the respective components of the game apparatus 3 via an AC adapter which is not shown. Further, when the power button 24, which is ON, is pressed again, the game apparatus 3 shifts to a low power standby mode. Also in this state, power is being supplied to the game apparatus 3, and therefore the game apparatus 3 continues to be connected to the network such as the Internet. When the power supply, which is ON, is to be OFF, the power supply can be OFF by pressing the power button 24 for a predetermined time period or longer period. When the reset button 25 is pressed, the system LSI 11 restarts a boot program of the game apparatus 3. The eject button 26 is connected to the disc drive 14. When the eject button 26 is pressed, the optical disc 4 is ejected from the disc drive 14.

Types of communication performed by the game apparatus 3 according to the present embodiment will be described. The types of the communication can be mainly classified into two. Communication (hereinafter, referred to as "constant connection allowing communication") using a constantly connected network so as to allow communication even in the low power standby mode as described above, is classified as one of the types. For example, communication (hereinafter, referred to as "as-needed connection communication") for controlling connection and communication so as to be enabled, every time the necessity arises, depending on an application program of a communication competition game, or the like, is classified as the other of the types. In the constant connection allowing communication, the I/O processor 11a independently transmits transmission data written in the flash memory 17 and writes the received data in the flash memory 17, as described above, regardless of programs such as the game program described below. Therefore, when used is an application (such as a mail application) using the constant connection allowing communication, it is possible to write, in the flash memory 17, data to be transmitted, and read, from the flash memory 17, the received data. Further, in the constant connection allowing communication, the communication can be periodically performed even in the low power standby mode. Further, even when a predetermined game program is being executed, the communication can be performed as a background process.

Figure 3:
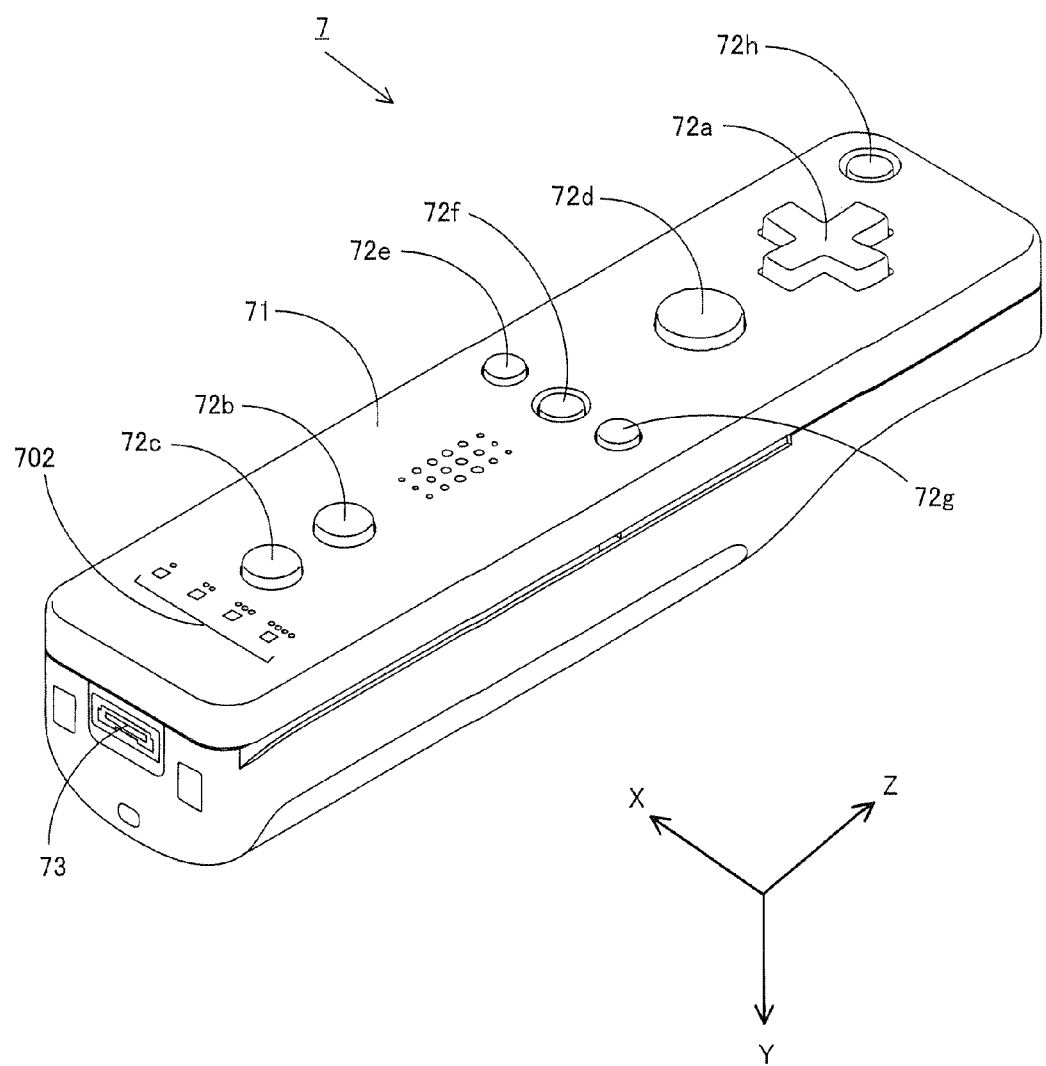
FIG. 3 is a perspective view of a controller 7 as viewed from the top rear side thereof.

With reference to FIGS. 3 to 4, the controller 7 will be described. FIG. 3 is a perspective view of the controller 7 as viewed from the top rear side thereof. FIG. 4 is a perspective view of the controller 7 as viewed from the bottom front side thereof.

As shown in FIGS. 3 and 4, the controller 7 includes a housing 71 formed by plastic molding or the like, and the housing 71 includes an operation section 72 having a plurality of operation portions. The housing 71 has a generally parallelepiped shape extending in a longitudinal direction from front to rear. The overall size of the housing 71 is small enough to be held by one hand of an adult or even a child.

At the center of the front portion of the top surface of the housing 71, a cross key 72a is provided. The cross key 72a is a cross-shaped four-direction push switch. The cross key 72a includes operation portions corresponding to the four directions (front, rear, right and left), which are located on projecting portions, respectively, which are arranged at intervals of 90 degrees so as to form a cross. The player selects one of the front, rear, right and left directions by pressing a corresponding one of the operation portions of the cross key 72a. Through an operation on the cross key 72a, the player can, for example, indicate a direction in which a player character or the like appearing in a virtual game world is to move or select one of a plurality of options.

Although the cross key 72a is an operation section for outputting an operation signal in accordance with the aforementioned direction input operation performed by the player, such an operation section may be provided in another form. For example, the cross key 72a may be replaced with an operation section, including four push switches corresponding to directions, respectively, represented by a cross, for outputting an operation signal in accordance with the push switch having been pressed by the player. Alternatively, the cross key 72a may be replaced with an operation section including the aforementioned four push switches and a center switch provided at the center of the cross formed by the four push switches. Alternatively, the cross key 72a may be replaced with an operation section which includes an inclinable stick (so-called a joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting a respective operation signal assigned to the operation buttons 72b, 72c, 72d, 72e, 72f or 72g when the player presses a head thereof. For example, the operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72a, 72b, 72c, 72d, 72e, 72f and 72g are assigned with various operation functions in accordance with the game program executed by the game apparatus 3. In an exemplary arrangement shown in FIG. 3, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he or she is using. Specifically, when the controller 7 transmits transmission data to the wireless communication module 18, one of the plurality of LEDs 702 is lit up so as to correspond to the controller type.

On the top surface of the housing 71, a sound hole for outputting a sound from a speaker (speaker 706 shown in FIG. 5) described below is formed between the operation button 72b and the operation buttons 72e, 72f, and 72g.

On the bottom surface of the housing 71, a recessed portion is formed. The recessed portion is formed at a position at which an index finger or middle finger of the player is located when the player holds the controller 7 with one hand so as to orient the front surface thereof to the markers 6L and 6R. On a slope surface of the recessed portion on the bottom surface of the housing 71, an operation button 72i is provided. The operation button 72i is an operation section acting as, for example, a B button.

On the front surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The imaging information calculation section 74 will be described below in detail. On the rear surface of the housing 71, the connector 73 is provided. The connector 73 is, for example, an edge connector, and is used for engaging and connecting the controller 7 with, for example, the connection cable.

Here, for giving specific description, a coordinate system is defined for the controller 7. As shown in FIGS. 3 and 4, XYZ-axes orthogonal to each other are defined for the controller 7. Specifically, the Z-axis is defined along the longitudinal direction of the housing 71 corresponding to the front-rear direction of the controller 7, and the direction toward the front surface (the surface on which the imaging information calculation section 74 is provided) of the controller 7 is defined as the Z-axis positive direction. The Y-axis is defined along the top-bottom direction of the controller 7, and the direction toward the bottom surface (the surface on which the operation button 72i is provided) of the housing 71 is defined as the Y-axis positive direction. The X-axis is defined along the right-left direction of the controller 7, and the direction toward the left side surface (the side surface shown in FIG. 4 but not shown in FIG. 3) of the housing 71 is defined as the X-axis positive direction.

Figure 5:
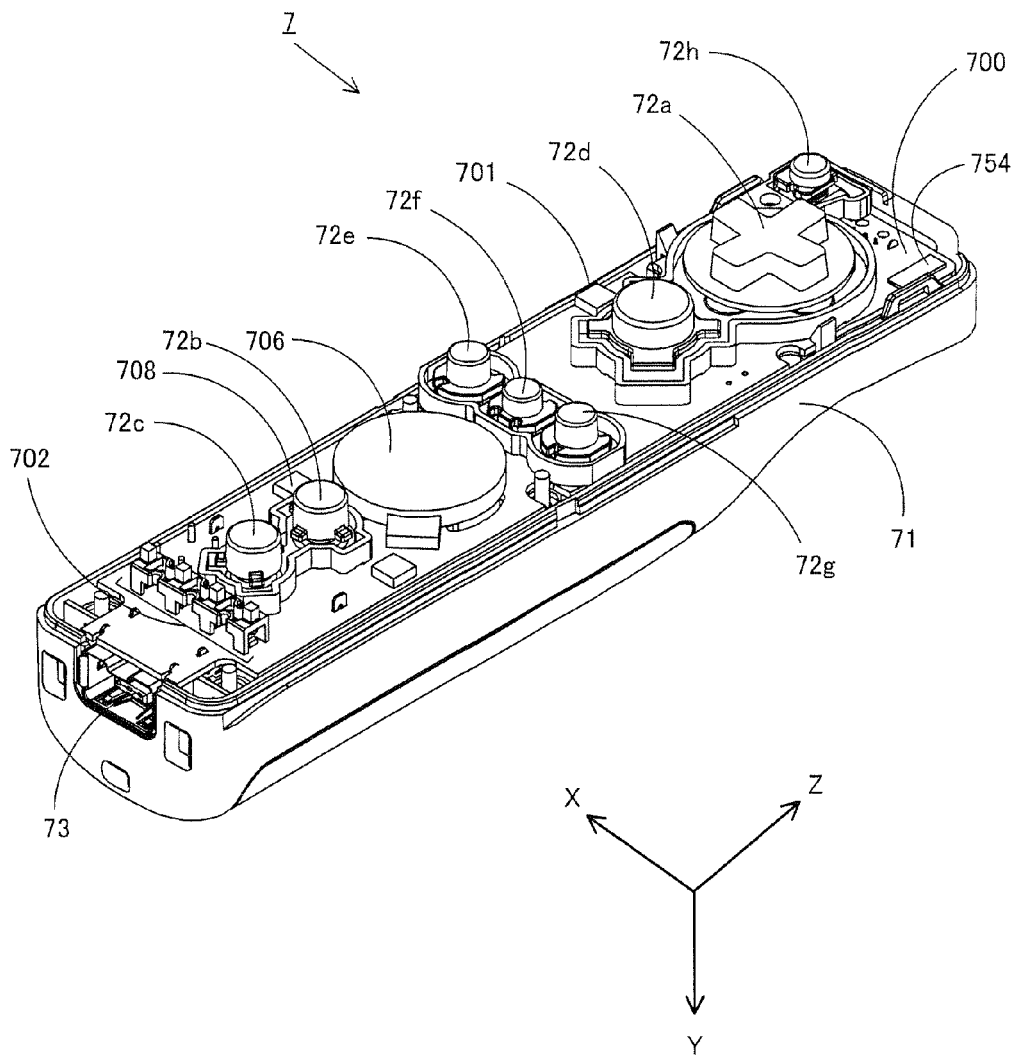
FIG. 5 is a perspective view illustrating a state where an upper housing of the controller 7 is removed.
Figure 6:
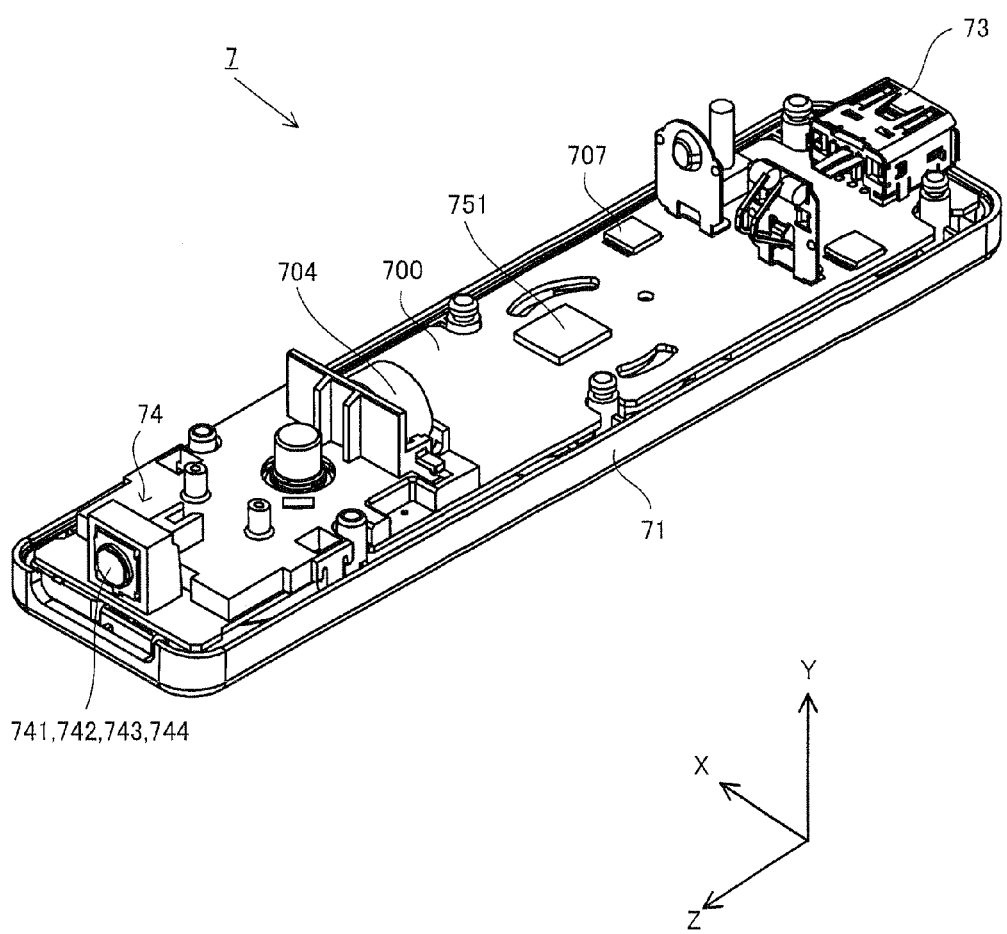
FIG. 6 is a perspective view illustrating a state where a lower housing of the controller 7 is removed.

With reference to FIGS. 5 and 6, an internal structure of the controller 7 will be described. FIG. 5 is a perspective view illustrating a state where an upper casing (a part of the housing 71) of the controller 7 is removed, as viewed from the rear surface side of the controller 7. FIG. 6 is a perspective view illustrating a state where a lower casing (a part of the housing 71) of the controller 7 is removed, as viewed from the front surface side of the controller 7. FIG. 6 is a perspective view illustrating a reverse side of a substrate 700 shown in FIG. 5.

As shown in FIG. 5, the substrate 700 is fixed inside the housing 71. On the top main surface of the substrate 700, the operation buttons 72a, 72b, 72c, 72d, 72e, 72f, 72g and 72h, an acceleration sensor 701, the LEDs 702, an antenna 754 and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. A quartz oscillator 703 (not shown), provided in the housing 71, generates a reference clock of the microcomputer 751 described below. On the top main surface of the substrate 700, the speaker 706 and an amplifier 708 are provided. The acceleration sensor 701 is provided to the left of the operation button 72d on the substrate 700 (that is, provided not at the center portion of the substrate 700 but near the periphery of the substrate 700). Accordingly, the acceleration sensor 701 is allowed to detect for both a direction change of the gravitational acceleration and an acceleration containing a component generated due to centrifugal force, in accordance with the controller 7 rotating about the longitudinal direction thereof. Therefore, by performing a predetermined calculation, the game apparatus 3 or the like is allowed to determine the rotation of the controller 7, with preferable accuracy, based on the acceleration data having been detected.

As shown in FIG. 6, at the front edge of the bottom main surface of the substrate 700, the imaging information calculation section 74 is provided. The imaging information calculation section 74 includes an infrared filter 741, a lens 742, the image pickup element 743 and an image processing circuit 744 located in order, respectively, from the front surface of the controller 7 on the bottom main surface of the substrate 700. At the rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via a wiring formed on the substrate 700 and the like, and outputs an audio signal to the speaker 706 via the amplifier 708 in accordance with sound data transmitted from the game apparatus 3.

On the bottom main surface of the substrate 700, a vibrator 704 is provided. The vibrator 704 may be, for example, a vibration motor or a solenoid. The vibrator 704 is connected to the microcomputer 751 by a wiring formed on the substrate 700 or the like, and is controlled so as to be ON/OFF in accordance with vibration data transmitted from the game apparatus 3. The controller 7 is vibrated by an actuation of the vibrator 704, and the vibration is conveyed to the player's hand holding the controller 7. Thus, a so-called vibration-feedback game is realized. The vibrator 704 is positioned slightly in front of the longitudinal center of the housing 71, and therefore a vibration of the housing 71 is enhanced so as to allow a player holding the controller 7 to easily feel the controller 7 vibrating.

Figure 7:
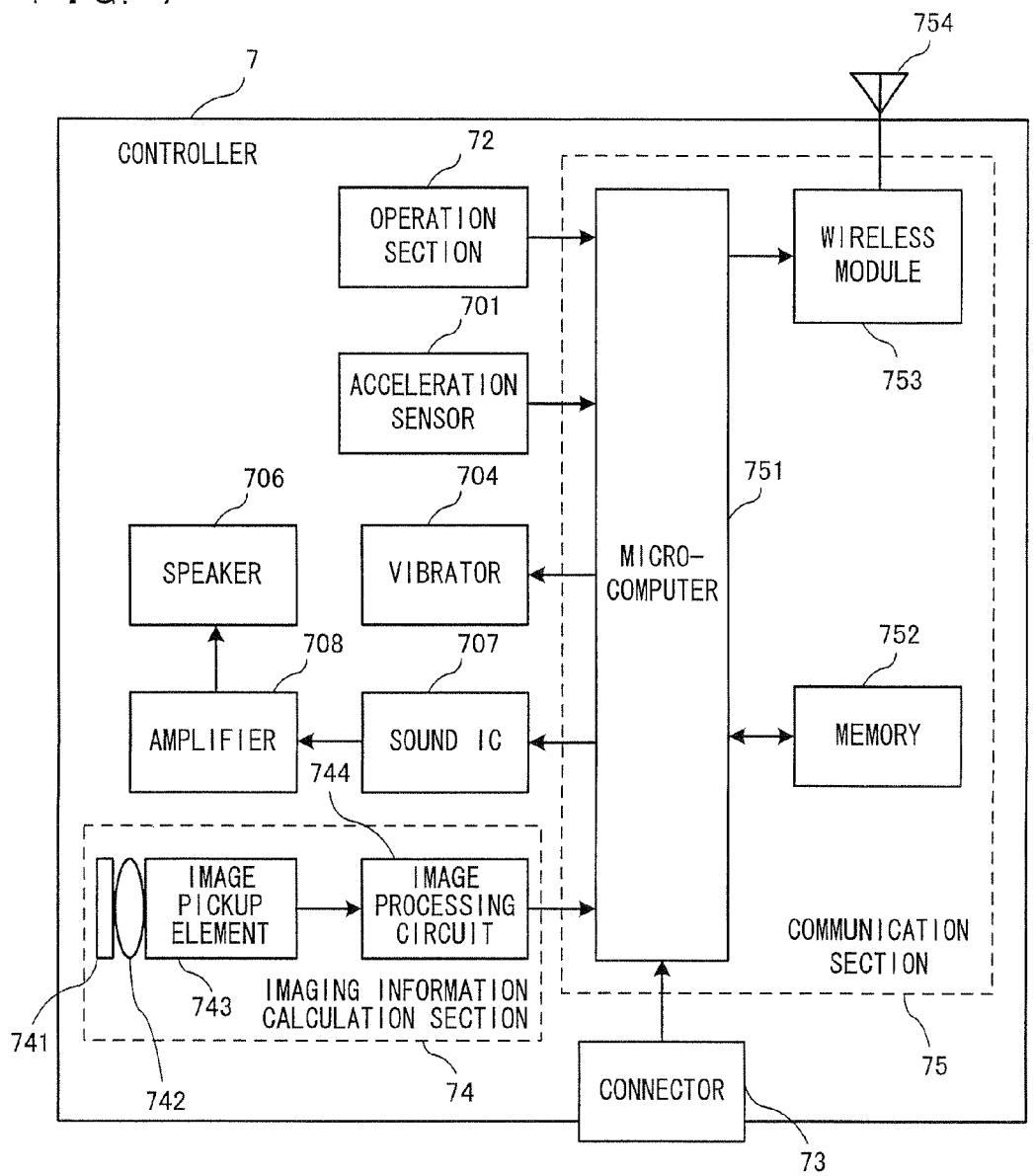
FIG. 7 is a block diagram illustrating a structure of the controller 7.

With reference to FIG. 7, the internal structure of the controller 7 will be described. FIG. 7 is a block diagram illustrating the structure of the controller 7.

As shown in FIG. 7, the controller 7 includes a communication section 75 in addition to the operation section 72, the imaging information calculation section 74, the acceleration sensor 701, the vibrator 704, the speaker 706, the sound IC 707, and the amplifier 708, which are described above.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pick-up device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs, to the communication section 75, process result data representing a position coordinate point and the area size of the identified spot. The imaging information calculation section 74 is fixed to the housing 71 of the controller 7. The imaging direction of the imaging information calculation section 74 can be changed by changing the direction of the housing 71.

The controller 7 preferably includes a three-axis (X-axis, Y-axis, and Z-axis) acceleration sensor 701. The three axis acceleration sensor 701 detects a linear acceleration in three directions, that is, the up/down direction (Y-axial direction shown in FIG. 3), the left/right direction (X-axial direction shown in FIG. 3), and the forward/backward direction (the Z-axial direction shown in FIG. 3).

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the processing. The microcomputer 751 controls operations of the sound IC 707 and the vibrator 704 based on the data received from the game apparatus 3 by the wireless module 753 via the antenna 754. The sound IC 707 processes the sound data and the like transmitted from the game apparatus 3 via the communication section 75. Further, the microcomputer 751 actuates the vibrator 704 based on, for example, the vibration data (for example, a signal for powering the vibrator 704 ON or OFF) transmitted by the game apparatus 3 via the communication section 75.

Data from the controller 7 including an operation signal (key data) from the operation section 72, acceleration signals (X, Y, and Z-axial direction acceleration data) of the three axial directions from the acceleration sensor 701, and the process result data from the imaging information calculation section 74 are outputted to the microcomputer 751. The microcomputer 751 temporarily stores the respective input data (the key data, the X, Y, and Z-axial direction acceleration data, and process result data) in the memory 752 as the transmission data which is to be transmitted to the wireless communication module 18. The wireless transmission from the communication section 75 to the wireless communication module 18 is performed periodically at predetermined time intervals. Since game process is generally performed at a cycle of 1/60 sec., data needs to be transmitted at a cycle of a time period shorter than the cycle of the game process. Specifically, the game process unit is 16.7 ms (1/60 sec.), and the transmission interval of the communication section 75 structured using the Bluetooth (registered trademark) technology is 5 ms. At a time at which the transmission to the wireless communication module 18 is to be performed, the microcomputer 751 outputs the transmission data stored in the memory 752 as a series of operation information to the wireless module 753. The wireless module 753 uses, for example, the Bluetooth (registered trademark) technology to transmit, from the antenna 754, operation information as a radio wave signal by using a carrier wave of a predetermined frequency. Thus, data from the controller 7 including the key data from the operation section 72, the X, Y, and Z-axial direction acceleration data from the acceleration sensor 701, and the process result data from the imaging information calculation section 74 are transmitted from the controller 7. The wireless communication module 18 of the game apparatus 3 receives the radio wave signal, and the game apparatus 3 demodulates or decodes the radio wave signal to obtain the series of operation information (the key data the X, Y, and Z-axial direction acceleration data, and the process result data). Based on the obtained operation information and the game program, the CPU 10 of the game apparatus 3 performs the game process. When the communication section 75 is structured by using the Bluetooth (registered trademark) technology, the communication section 75 can function so as to receive transmission data which is wirelessly transmitted from another device.

The structure of the game system 1 as described above is merely an example, and the present invention is applicable to any information processing device such as a hand-held game apparatus and a mobile telephone.

According to the present embodiment, as shown in FIG. 8, a data distribution system comprises a server device 8 and a plurality (for example, three in FIG. 8) of the game apparatuses 3a, 3b, and 3c. In the following description, each of the plurality of the game apparatuses 3 is capable of communicating with the server device 8 through a communication network such as the Internet, for example. The communication between each of the plurality of the game apparatuses 3 and the server device 8 may be performed by using one of the constant connection allowing communication or the as-needed connection communication as described above.

Figure 9:
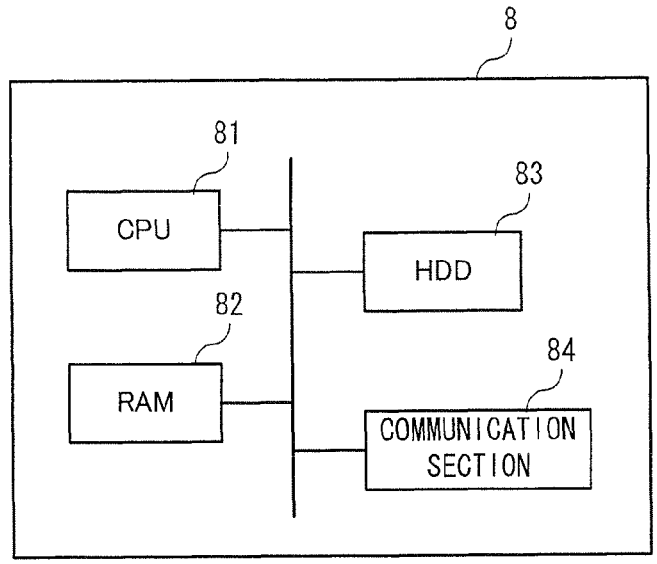
FIG. 9 is a block diagram illustrating a configuration of a server device 8.

The server device 8 is, in general, a typical general-purpose computer including the CPU 81, a RAM 82, an HDD 83, and a communication section 84, as shown in FIG. 9.

Hereinafter, operations performed by the game apparatus 3 and the server device 8 of the data distribution system will be described in detail.

Figure 10:
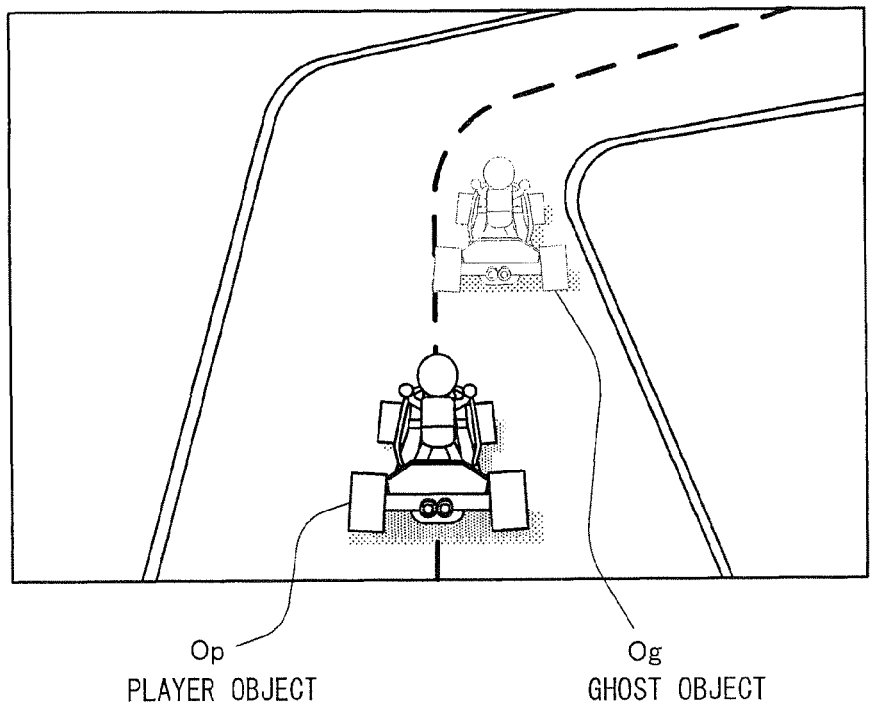
FIG. 10 is a diagram illustrating an example of a game screen displayed when a game is executed by the game apparatus 3.

FIG. 10 is a diagram illustrating an exemplary game screen of a game executed by the game apparatus 3. While in the present embodiment the game apparatus 3 executes a racing game, the present invention is not limited thereto, and other games may be executed.

In the racing game executed by the game apparatus 3, a player operates a player object Op in a game space by using the controller 7. In the racing game, a player is allowed to optionally select one game mode from among at least two game modes, that is, a time attack mode in which only the player object Op runs a racecourse, and a competing-with-ghost mode in which the player object Op competes with a ghost object Og, thereby playing the game in the selected game mode. FIG. 10 is a diagram illustrating an exemplary game screen displayed when a player is playing the game in the competing-with-ghost mode.

The ghost object Og represents an object which moves on a racecourse in a manner identical to (or almost the same as) that in which a player object Op, operated by a player (hereinafter, referred to as a current player) who is currently playing the game or another player, previously moved on the racecourse. A movement of the ghost object Og is controlled by the CPU 10 in accordance with ghost data (described below in detail) used for reproducing a movement of the player object Op which was previously operated during a game play. The ghost data is generated when a player plays the racing game.

The server device 8 collects the ghost data from the plurality of the game apparatuses 3 (the plurality of the game apparatuses 3 are not limited to the game apparatuses 3a, 3b, and 3c, and, for example, the number of the plurality of the game apparatuses 3 may be 10,000), and stores the ghost data in the HDD 83. In accordance with a request from one of the plurality of the game apparatuses 3, the server device 8 transmits, to the one of the plurality of the game apparatuses 3, appropriate ghost data among all the ghost data stored in the HDD 83. Thus, a user of the game apparatus 3 is allowed to download, as necessary, the ghost data, stored in the server device 8, of a user of another game apparatus 3, and compete with the user of the other game apparatus 3 by using the ghost data.

The game apparatus 3 may directly receive, from another game apparatus 3, the ghost data generated by the other game apparatus 3, through a communication line or a storage medium, instead of the ghost data generated by the other game apparatus 3 being downloaded from the server device 8.

Figure 11:
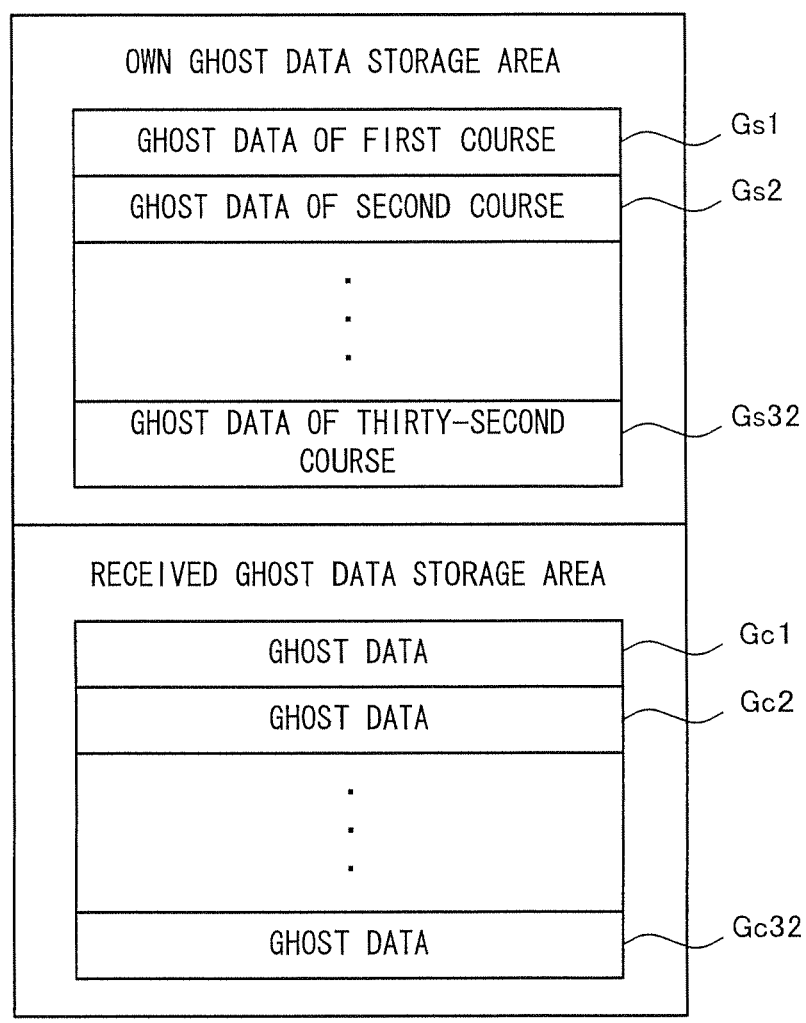
FIG. 11 is a diagram illustrating an exemplary memory map of a flash memory 17.

FIG. 11 is a diagram illustrating a memory map of the flash memory 17 of the game apparatus 3. The flash memory 17 stores the ghost data (hereinafter, referred to as "own ghost data") generated when the racing game is played by the game apparatus 3 of a player him/herself, and the ghost data (hereinafter, referred to as "received ghost data") which is downloaded from the server device 8 or received from another game apparatus 3.

In the present embodiment, 32 racecourses of the first to the thirty-second courses are provided for the racing game, and the flash memory 17 stores the own ghost data obtained in one complete play, for each racecourse, in an own ghost data storage area. Specifically, the flash memory 17 stores the own ghost data for 32 courses in total, that is, ghost data Gs1 for the first course to ghost data Gs32 for the thirty-second course. When one game apparatus 3 is used by a plurality of players, the own ghost data storage area may be separately provided for each player.

The ghost data for maximum 32 plays, that is, the received ghost data Gc1 to Gc32, may be stored in the received ghost data storage area.

FIG. 12 is a diagram illustrating a specific example of the ghost data. The ghost data includes information such as: a name of a user who played the racing game; a user icon ID for defining a user icon used for identifying the user on a screen; a residence area of the user (that is, an area representing a place in which the game apparatus 3 is set); a course number of a racecourse used by the user playing the game; a character number indicating a driver of a racing car operated by the user; a machine type representing a type of the racing car operated by the user; play data representing a content of an operation performed by the user; accomplishment time representing an elapsed time from a start to a goal with an accuracy of $\frac{1}{1000}$ second; play date and time representing a date and time at which the racing game was played (that is, a date and time at which the ghost data was generated); and the like.

The play data represents a transition of an input operation performed by a user in a time period from a start to a goal in a race, as shown in FIG. 13. For example, the play data shown in FIG. 13 indicates that, on the controller 7, the A button 72d and a front operation portion of the cross key 72a are pressed in the time period from [0:0:000] (minute:second:microsecond) (that is, a start time) to [0:0:353], and only the A button 72d of the controller 7 is pressed in a time period from [0:0:354] to [0:1:001]. By using the play data, as necessary, any of the plurality of the game apparatuses 3 is allowed to reproduce, at any time, the movement of the player object Op operated in the racing game which was previously played.

In the present embodiment, data representing a transition of an input operation performed by a user is used as the play data to reproduce a movement of the player object Op in the racing game previously played. However, the present invention is not limited thereto. In another example, movement data representing a behavior of the player object Op in the racing game which was previously played, e.g., data representing a transition of a coordinate point indicating a position of the player object Op, may be used as the play data.

FIG. 14 is a diagram illustrating a specific example of a ghost table stored in the HDD 83 of the server device 8. The ghost table represents a database which contains the ghost data collected from the plurality of the game apparatuses 3 so as to be associated with the course number and time section number. The course number is used for distinguishing among the first to the thirty-second courses so as to identify a racecourse, as described above. The time section number is a number used for distinguishing among 100 time sections into which the accomplishment time is divided, for each racecourse, so as to identify a time section. A time range of each time section is defined, for each racecourse, in accordance with time section setting data shown in FIG. 15. The time section setting data is stored in the HDD 83 of the server device 8, as with the ghost table.

In accordance with the time section setting data shown in FIG. 15, for example, the time range of the time section [01] for the course number [01] (that is, the first course) is defined as a time range from [2:1:001] to [2:2:000]. Further, the time range of the time section [02] for the course number [32] is defined as a time range from [4:2:001] to [4:3:000]. The time range of each time section is individually set for each racecourse because the accomplishment time substantially depends on the entire length and the difficulty level of a racecourse. For example, when used is the racecourse of the course number [01] in which the entire length thereof is short, most of the players have the accomplishment time ranging from [2:0:001] to [3:40:000]. On the other hand, when used is the racecourse of the course number [02] in which the entire length thereof is long, most of the players have the accomplishment time greater than [4:0:001].

In the present embodiment, the time range of each time section is set based on the time section setting data as described above. However, the present invention is not limited thereto. For example, the time range of each time section may be the same among all the racecourses. The time range of each time section may be automatically changed by the CPU 81 of the server device 8 depending on a situation.

The ghost table shown in FIG. 14 contains the ghost data for each time section based on the time section setting data as described above. Specifically, when the CPU 81 of the server device 8 receives the ghost data from the game apparatus 3, the CPU 81 checks the course number and the accomplishment time contained in the received ghost data, and determines the course number and the time section number, in the ghost table, associated with the ghost data, so as to be stored in the storage area for the course number and the time section number. For example, when the course number contained in the ghost data received from the game apparatus 3 is [02], and the accomplishment time is [5:35:1101], the time section number for the ghost data is determined as [02] in accordance with the time section setting data shown in FIG. 15. Therefore, the ghost data is registered in the ghost table as the ghost data for the time section number [02] of the course number [02].

In the present embodiment, the ghost data for maximum 20 users are registered for each time section of each racecourse in the ghost table. Therefore, when the ghost data for 20 users are registered in one of the time sections for one of the course numbers (that is, when the number of users for which the ghost data are registered reaches the maximum registration allowable number), and the ghost data for the same one of the time sections is newly received, the CPU 81 of the server device 8 deletes, from the ghost table, the ghost data having been registered or generated earliest of all the registered ghost data, and registers, in the ghost table, the ghost data having been newly received. As an exemplary modification, the ghost data having been newly received is registered, and thereafter the earliest ghost data of all the registered ghost data may be deleted. In this case, the number of users for which the ghost data are registered in the ghost table is greater than the maximum registration allowable number, only for a short period of time.

In the present embodiment, the maximum number of users for which the ghost data are to be registered in the ghost table is uniformly 20 for each time section of each racecourse. The present invention is not limited thereto. The maximum registration allowable number may be different for each racecourse or for each time section. Further, the CPU 81 of the server device 8 may automatically change, depending on a situation, the maximum registration allowable number for each time section of each racecourse.

The HDD 83 of the server device 8 stores the ghost data of the world champion and the local champion (for example, Japan champion, US champion, and European champion), in addition to the ghost table and the time section setting data as described above. The world champion represents the ghost data including the accomplishment time which is best of all the ghost data of users all over the world. The local champion represents the ghost data including the accomplishment time which is best in an area corresponding to the residence area of the ghost data. The ghost data of each of the world champion and the local champion has its data updated every time the ghost data including the accomplishment time representing a new record is registered in the ghost table.

Figure 16:
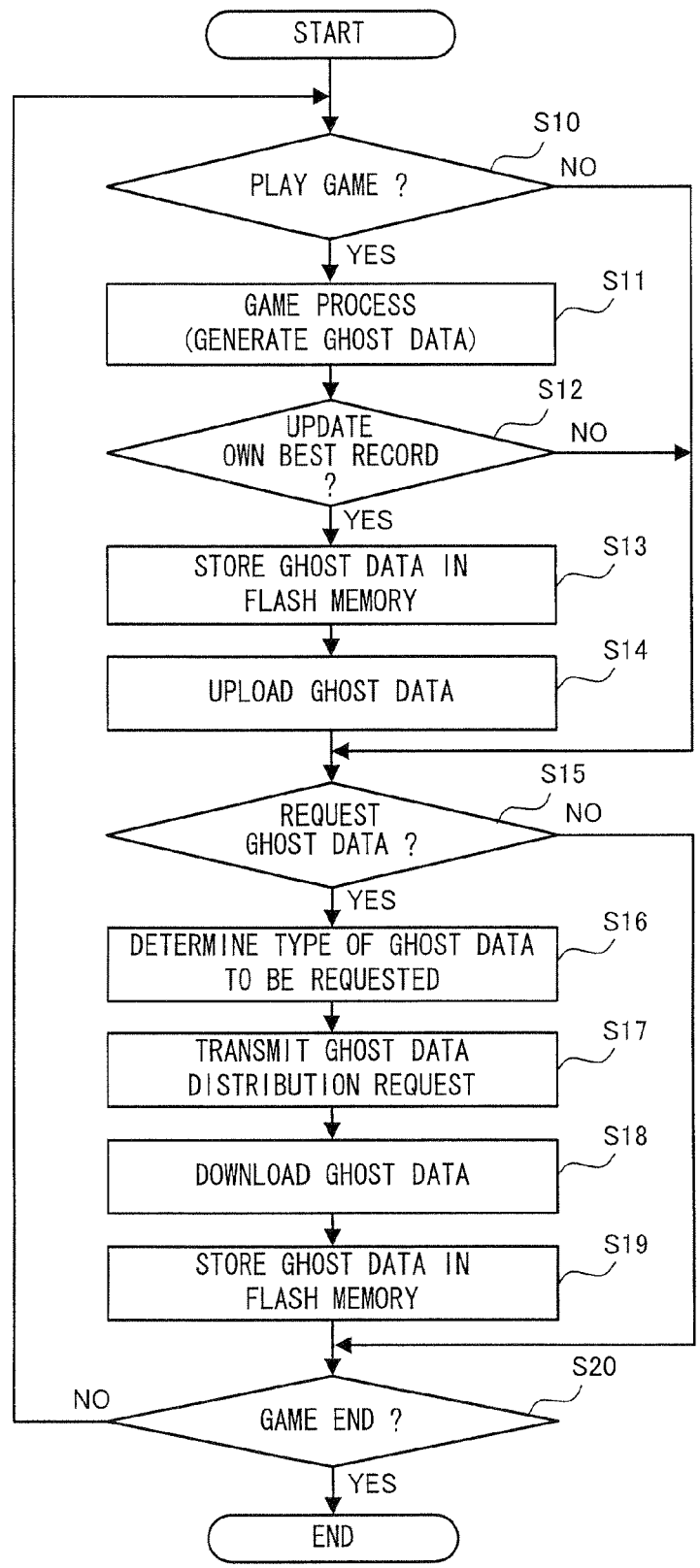
FIG. 16 is flow chart illustrating a flow of a process performed by the CPU 10 of the game apparatus 3.

Next, an operation performed by the CPU 10 of the game apparatus 3 will be described with reference to the flow chart shown in FIG. 16. The flow chart shows a flow of a process based on a racing game program executed by the CPU 10. The racing game program is stored in the optical disc 4, and loaded to the internal main memory 11e or the external main memory 12 as necessary.

When the execution of the racing game program is started, the CPU 10 initially determines, in step S10, whether or not the racing game is to be started, in accordance with an instruction inputted from a user by using the controller 7. When the instruction from the user indicates that the racing game is to be started, the process advances to step S11. Otherwise, the process advances to step S15.

In step S11, the CPU 10 executes the game process. Specifically, the CPU 10 controls the player object Op in the game world in accordance with the operation information inputted from the controller 7, thereby generating a game screen. In a mode in which the player object Op competes with the ghost object Og, the ghost object Og in the game world is controlled in accordance with any of the ghost data (the own ghost data or the received ghost data) stored in the flash memory 17 of the game apparatus 3.

In step S11, the CPU 10 executes a process of generating the ghost data including the play data described above, in accordance with the operation information inputted from the controller 7 during the racing game being played while executing the aforementioned game process.

When the racing game is ended, the CPU 10 determines, in step S12, whether or not the accomplishment time of the racing game having been most recently played is better than the player's own record. When the accomplishment time of the racing game having been most recently played is better than the player's own record, the process advances to step S13. Otherwise, the process advances to step S15.

In step S13, the CPU 10 updates the own ghost data, of the relevant racecourse, stored in the flash memory 17 by replacing the own ghost data with the ghost data generated in step S11.

In step S14, the CPU 10 transmits the ghost data generated in step S11, via the wireless communication module 18 and the communication network, to the server device 8. Thus, the ghost data transmitted to the server device 8 is registered in the ghost table by the server device 8.

In step S15, the CPU 10 determines whether or not the ghost data is to be requested from the server device 8, in accordance with the instruction inputted from the user by using the controller 7. When the instruction for downloading the ghost data is provided by the user, the process advances to step S16. Otherwise, the process advances to step S20. The ghost data may be downloaded from the server device 8 when, for example, the execution of the racing game program is started, or at regular time intervals (for example, once a day) by using the aforementioned constant connection allowing communication as well as when an instruction is made by a user.

In step S16, the CPU 10 determines a type of the ghost data to be requested from the server device 8, in accordance with the instruction inputted from the user by using the controller 7. In the present embodiment, the ghost data which can be requested from the server device 8 includes, for example, the ghost data including the accomplishment time near the user's own record (that is, the ghost data including the accomplishment time which is almost the same as the user's own record, or the ghost data including the accomplishment time which is slightly better than the user's own record), the ghost data of the world champion, and the ghost data of the local champion. In the present embodiment, the type of the ghost data, which is to be requested from the server device 8, is designated by a user. However, the present invention is not limited thereto. For example, the ghost data including the accomplishment time near the user's own record may be automatically requested from the server device 8, at regular time intervals, by using the constant connection allowing communication as described above.

In step S17, the CPU 10 transmits a ghost data distribution request to the server device 8 through the wireless communication module 18 and the communication network. The ghost data distribution request includes the type of the ghost data determined in step S16, and, as necessary, the course number of the racecourse for which the ghost data is requested. When the ghost data including the accomplishment time near the user's own record is requested from the server device 8, the CPU 10 reads the accomplishment time of the own ghost data stored in the own ghost data storage area (as shown in FIG. 11) of the flash memory 17, and transmits both the accomplishment time of the own ghost data and the ghost data distribution request to the server device 8. Further, when the ghost data to be requested from the server device 8 is the ghost data of the local champion, the CPU 10 transmits both the residence area and the ghost data distribution request to the server device 8.

In step S18, the ghost data satisfying the ghost data distribution request transmitted in step S17 is received from the server device 8.

In step S19, the ghost data received from the server device 8 is stored in the received ghost data storage area (FIG. 11) of the flash memory 17. When the received ghost data for 32 users, which are the maximum storage allowable number of users, are stored in the received ghost data storage area, the received ghost data for one user is deleted in accordance with the instruction from a user, and thereafter the ghost data having been received in step S18 is newly stored. After the ghost data is downloaded from the server device 8, the CPU 10 may automatically start to perform game process in the competing-with-ghost mode using the ghost data having been downloaded.

In step S20, whether or not the game is to be ended (that is, whether or not the execution of the racing game program is to be ended) is determined in accordance with the instruction inputted from the user by using the controller 7. When the game is to be continued, the process is returned to step S10. When the game is to be ended, the execution of the game program is ended.

Figure 17:
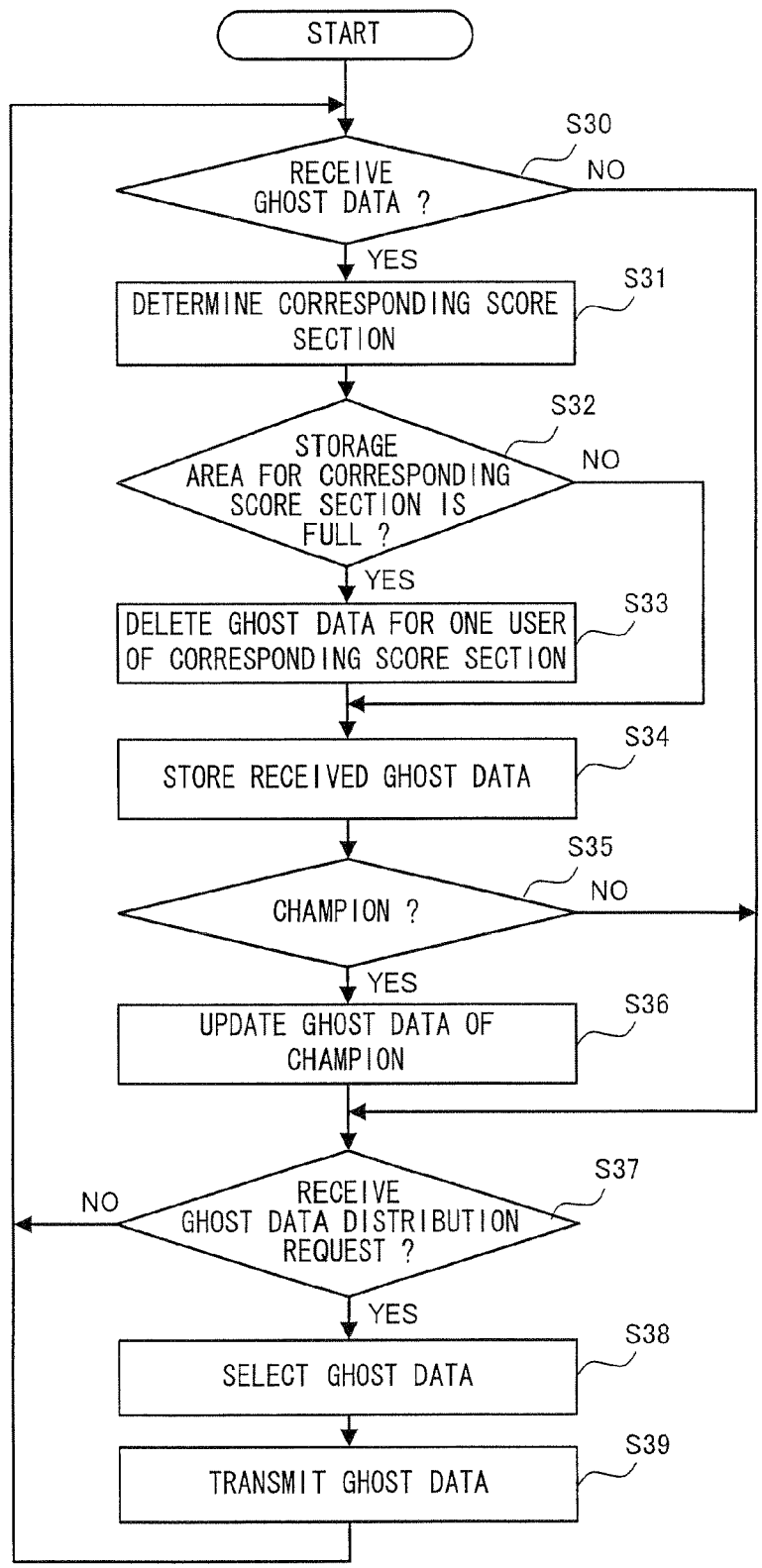
FIG. 17 is a flow chart illustrating a flow of a process performed by the CPU 81 of the server device 8.

Next, an operation performed by the CPU 81 of the server device 8 will be described with reference to the flow chart shown in FIG. 17. The flow chart shows a flow of the process based on the data management program executed by the CPU 81. The data management program is stored in the HDD 83, and loaded to the RAM 82 as necessary.

When the execution of the data management program is started, the CPU 81 initially determines, in step S30, whether or not the ghost data has been received through the communication section 84 from one of the plurality of the game apparatuses 3. When the ghost data has been received from one of the plurality of the game apparatuses 3, the process advances to step S31. Otherwise, the process advances to step S37.

In step S31, the CPU 81 determines a score section with which the received ghost data is to be associated, in accordance with the course number and the accomplishment time included in the ghost data received in step S30, and the time section setting data (FIG. 15) stored in the HDD 83.

In step S32, the CPU 81 determines whether or not the ghost data for the maximum registration allowable number of users are registered in the storage area for the time section, in the ghost table, with which the ghost data having been received in step S30 is to be associated. When the storage area for the time section with which the ghost data having been received in step S30 is associated is full, the process advances to step S33. Otherwise, the process advances to step S34.

In step S33, the CPU 81 deletes the ghost data having the earliest play date and time (that is, the ghost data having the earliest generation date and time) of all the ghost data stored in the storage area for the time section with which the ghost data having been received in step S30 is associated. In a case where the ghost table contains old ghost data for a long period of time, when a user desires that the ghost data be downloaded, the ghost data having been previously downloaded is likely to be downloaded again, thereby preventing the user from feeling fresh. In the present embodiment, however, the ghost data stored in each time section is deleted in chronological order, and therefore the old ghost data is prevented from remaining in the ghost table for a long period of time. The ghost data having been earliest registered in the ghost table may be deleted instead of deleting the ghost data having the earliest play date and time.

In step S34, the CPU 81 stores the ghost data having been received in step S30, in the storage area for the corresponding time section in the ghost table. The process step of step S34 may be performed preceding the process step of step S32. In this case, the ghost data having been received in step S30 is stored in the storage area for the corresponding time section in the ghost table, and thereafter whether or not the number of users for which the ghost data are registered in the storage area for the time section, in which the received ghost data has been stored, is greater than the maximum registration allowable number, may be determined. When the number of the users for which the ghost data are registered is greater than the maximum registration allowable number, the ghost data having the earliest play date and time or the earliest registration date and time may be deleted from the stored ghost data.

In step S35, the CPU 81 compares the accomplishment time of the ghost data having been received in step S30, with the accomplishment time of the ghost data of each of the world champion and the local champion having been most recently stored in the HDD 83, so as to determine whether or not the ghost data having been received in step S30 represents a new world champion and/or local champion. In the comparison with the local champion, the accomplishment time of the ghost data having been received in step S30 is compared with the accomplishment time of the ghost data, of the local champion, which includes the same residence area as that of the ghost data having been received in step S30, among the ghost data registered as the local champion. When the ghost data having been received in step S30 represents a new champion, the process advances to step S36. Otherwise, the process advances to step S37.

In step S36, the CPU 81 updates the ghost data of the world champion and/or the local champion, which are stored in the HDD 83. The ghost data of the local champion is updated by updating the ghost data of the local champion, which includes the same residence area as that of the ghost data having been received in step S30.

In step S37, the CPU 81 determines whether or not the ghost data distribution request as described above is received from one of the plurality of the game apparatuses 3 through the communication section 84. When the ghost data distribution request is received from one of the plurality of the game apparatuses 3, the process advances to step S38. Otherwise, the process is returned to step S30.

In step S38, the CPU 81 selects the ghost data for one user from among the ghost data, stored in the HDD 83, for a plurality of users, in accordance with the ghost data distribution request having been received in step S37. Specifically, for example, when requested is the ghost data including the accomplishment time which is almost equivalent to the own record of the user using the game apparatus 3 which has transmitted the ghost data distribution request, the CPU 81 selects at random the ghost data for one user from among the ghost data which are registered so as to be associated with the same time section as that for the accomplishment time of the user using the game apparatus 3 which has transmitted the ghost data distribution request, in accordance with the accomplishment time corresponding to the user's own record, which has been received with the ghost data distribution request. Further, for example, when requested is the ghost data including the accomplishment time which is slightly better than the own record of the user using the game apparatus 3 which has transmitted the ghost data distribution request, the CPU 81 selects at random the ghost data for one user from among the ghost data which are registered so as to be associated with the time section which is ranked one section higher than the time section for the accomplishment time of the user using the game apparatus 3 which has transmitted the ghost data distribution request. Further, for example, when the ghost data of the world champion is requested, the CPU 81 selects the ghost data of the world champion stored in the HDD 83. Further, for example, when the ghost data of the local champion is requested, the CPU 81 selects the ghost data including the residence area of the user from among the ghost data of the local champion stored in the HDD 83.

In step S39, the CPU 81 transmits, to the game apparatus 3 having transmitted the ghost data distribution request, the ghost data selected in step S38. Then, the process is returned to step S30.

As described above, according to the present embodiment, the total capacity for storing the ghost data in a server can be limited to a predetermined range of capacity, and further the ghost data can be acquired in accordance with a skill of each player.

In the present embodiment, the ghost table is sectioned in accordance with the accomplishment time of the racing game. However, the present invention is not limited thereto. For example, the ghost table may be sectioned in accordance with any index, such as a stage clear time of a puzzle game, and an acquired score of an action game, indicating whether the game is played well or poorly (that is, indicating a skill of the user), in addition to the accomplishment time.

While example embodiments of the invention have been described in detail, the foregoing description is in all aspects illustrative and not restrictive. It is understood that numerous other modifications and variations can be devised without departing from the scope of the invention.

What is claimed is:

1. A data management apparatus for collecting data generated by a plurality of information terminals, and transmitting, in accordance with a request from one of the plurality of information terminals, necessary data to the one of the plurality of information terminals, the data management apparatus comprising:
  a receiver configured to receive, from one of the plurality of information terminals, both ghost data used for reproducing a game process having been executed in accordance with an operation performed by a user of the one of the plurality of information terminals, and data based on score data, the score data representing an index indicating a skill of a game based on the ghost data and the data based on the score data being score-related data, and
  a database processing section configured to register, in accordance with a definition of a database in which a plurality of score sections are defined based on a value represented by the score data, the ghost data received from the one of the plurality of information terminals into one of the score sections in the database, the one of the score sections corresponding to the score-related data received together with the ghost data.

2. The data management apparatus according to claim 1, wherein a maximum allowable registration number of ghost data is defined for each of the score sections in the database.

3. The data management apparatus according to claim 2, wherein the database processing section includes a deletion section configured to delete at least one piece of registered ghost data as necessary so as to register a new piece of ghost data into the database in such a manner that the number of pieces of ghost data in one of the score sections into which the new piece of ghost data is registered does not exceed the maximum allowable registration number of ghost data.

4. The data management apparatus according to claim 3, further comprising a transmitter configured to transmit, to one of the plurality of information terminals, the ghost data for at least one user for which the ghost data is registered so as to be associated with one of the plurality of score sections in the database, in accordance with a ghost data distribution request for requesting the ghost data, when the ghost data distribution request is received from the one of the plurality of information terminals.

5. The data management apparatus according to claim 4, wherein
  the ghost data distribution request from a one of the plurality of information terminals includes the score-related data of the game played by using the one of the plurality of information terminals, and
  the transmitter transmits, to the one of the plurality of information terminals, the ghost data for at least one user for which the ghost data is registered so as to be associated with one of the plurality of score sections, the one of the plurality of score sections being associated with the score-related data included in the ghost data distribution request.

6. The data management apparatus according to claim 4, wherein
  the ghost data distribution request from one of the plurality of information terminals includes the score-related data of the game played by using the one of the plurality of information terminals, and
  the transmitter transmits, to the one of the plurality of information terminals, the ghost data for at least one user for which the ghost data is registered so as to be associated with one of the plurality of score sections in the vicinity of another one of the plurality of score sections, the another one of the plurality of score sections being associated with the score-related data included in the ghost data distribution request.

7. The data management apparatus according to claim 4, wherein
  the ghost data includes information of an area in which the ghost data is generated, and the ghost data distribution request from the one of the plurality of information terminals includes information of an area in which the one of the plurality of information terminals is provided, and
  the transmitter transmits, to the one of the plurality of information terminals, the ghost data having been received with the score data which is best of all the score data of the ghost data including the information of the area which is the same as the information of the area included in the ghost data distribution request.

8. The data management apparatus according to claim 1, further comprising
  transmitter for transmitting, to one of the plurality of information terminals, the ghost data for at least one user for which the ghost data is registered so as to be associated with one of the plurality of score sections in the database, in accordance with a ghost data distribution request for requesting the ghost data, when the ghost data distribution request is received from the one of the plurality of information terminals.

9. The data management apparatus according to claim 8, wherein
the ghost data distribution request from one of the plurality of information terminals includes the score-related data of the game played by using the one of the plurality of information terminals, and
the transmitter transmits, to the one of the plurality of information terminals, the ghost data for at least one user for which the ghost data is registered so as to be associated with one of the plurality of score sections, the one of the plurality of score sections being associated with the score-related data included in the ghost data distribution request.

10. The data management apparatus according to claim 8, wherein
the ghost data distribution request from one of the plurality of information terminals includes the score-related data of the game played by using the one of the plurality of information terminals, and
the transmitter transmits, to the one of the plurality of information terminals, the ghost data for at least one user for which the ghost data is registered so as to be associated with one of the plurality of score sections in the vicinity of another one of the plurality of score sections, the another one of the plurality of score sections being associated with the score-related data included in the ghost data distribution request.

11. The data management apparatus according to claim 8, wherein
the ghost data includes information of an area in which the ghost data is generated, and the ghost data distribution request from the one of the plurality of information terminals includes information of an area in which the one of the plurality of information terminals is provided, and
the transmitter transmits, to the one of the plurality of information terminals, the ghost data having been received with the score data which is best of all the score data of the ghost data including the information of the area which is the same as the information of the area included in the ghost data distribution request.

12. The data management apparatus according to claim 1, wherein the ghost data includes key operation history data in which keys, of a corresponding one of the plurality of information terminals, operated by a user are stored in chronological order.

13. The data management apparatus according to claim 1, wherein,
the ghost data includes action data representing an action of a subject to be operated in a game space, when a user operates keys of a corresponding one of the plurality of information terminals.

14. The data management apparatus according to claim 1, wherein,
the game process is a process performed in a racing game which allows a user to operate a game character,
the ghost data is used for reproducing a movement of the game character operated by a user playing the game in which the user competes in a time in which the racing game is cleared, or a time in which a course is finished, and the score data is time information representing the time in which the racing game is cleared, or the time in which a course is finished.

15. The data management apparatus according to claim 3, wherein the deletion section deletes the ghost data having been registered in the database earliest of all the ghost data of one of the plurality of score sections, the one of the plurality of score sections being associated with the ghost data having been newly received.

16. The data management apparatus according to claim 3, wherein the deletion section deletes the ghost data having been generated, by one of the plurality of information terminals, earliest of all the ghost data of one of the plurality of score sections, the one of the plurality of score sections being associated with the ghost data having been newly received.

17. A data distribution system for allowing a data management apparatus to collect data generated by a plurality of information terminals, and transmit, in accordance with a request from a one of the plurality of information terminals, necessary data to the one of the plurality of information terminals, wherein
each of the plurality of information terminals includes
a data generation section configured to generate both ghost data used for reproducing a game process having been executed in accordance with an operation performed by a user of said each of the plurality of information terminals, and data based on score data (hereinafter referred to as score-related data), the score data representing an index indicating a skill of a game based on the ghost data,
a data transmitter configured to transmit, to the data management apparatus, the ghost data generated by the data generation section and the score-related data based on the ghost data, and
a request transmitter configured to transmit, to the data management apparatus, a ghost data distribution request for requesting the ghost data, and
the data management apparatus includes
a data receiver configured to receive, from the plurality of information terminals, the ghost data, and the score-related data based on the ghost data,
a database processing section configured to register, in accordance with a definition of a database in which a plurality of score sections are defined based on a value represented by the score data, the ghost data received from the one of the plurality of information terminals into one of the score sections in the database, the one of the score sections corresponding to the score-related data received together with the ghost data, and
a data transmitter configured to transmit, to a one of the plurality of information terminals, the ghost data for at least one user for which the ghost data is registered so as to be associated with one of the plurality of score sections in the database, in accordance with the ghost data distribution request, among the ghost data stored by the database processing section, when the ghost data distribution request is received from the one of the plurality of information terminals.

18. A data management method for collecting data generated by a plurality of information terminals, and transmitting, in accordance with a request from a one of the plurality of information terminals, necessary data to the one of the plurality of information terminals, the data management method comprising the steps of:
receiving, from one of the plurality of information terminals, both ghost data used for reproducing a game process having been executed in accordance with an operation performed by a user of the one of the plurality of information terminals, and data based on score data (hereinafter referred to as score-related data), the score data representing an index indicating a skill of a game based on the ghost data, and
processing a database by registering, in accordance with a definition of a database in which a plurality of score sections are defined based on a value represented by the score data, the ghost data received from the one of the plurality of information terminals into one of the score sections in the database, the one of the score sections corresponding to the score-related data received together with the ghost data.

* * * * *